April 22, 1958 C. B. SHEPPARD ET AL 2,831,700
PRE-SELECTOR FOR POSITIONING RUNNING GEAR
RELATIVE TO TRAILER BODY LOAD
Filed May 10, 1955 5 Sheets-Sheet 1
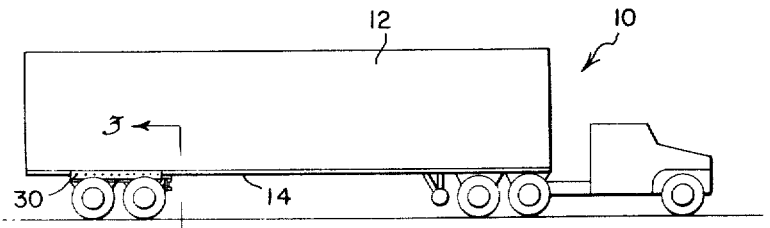
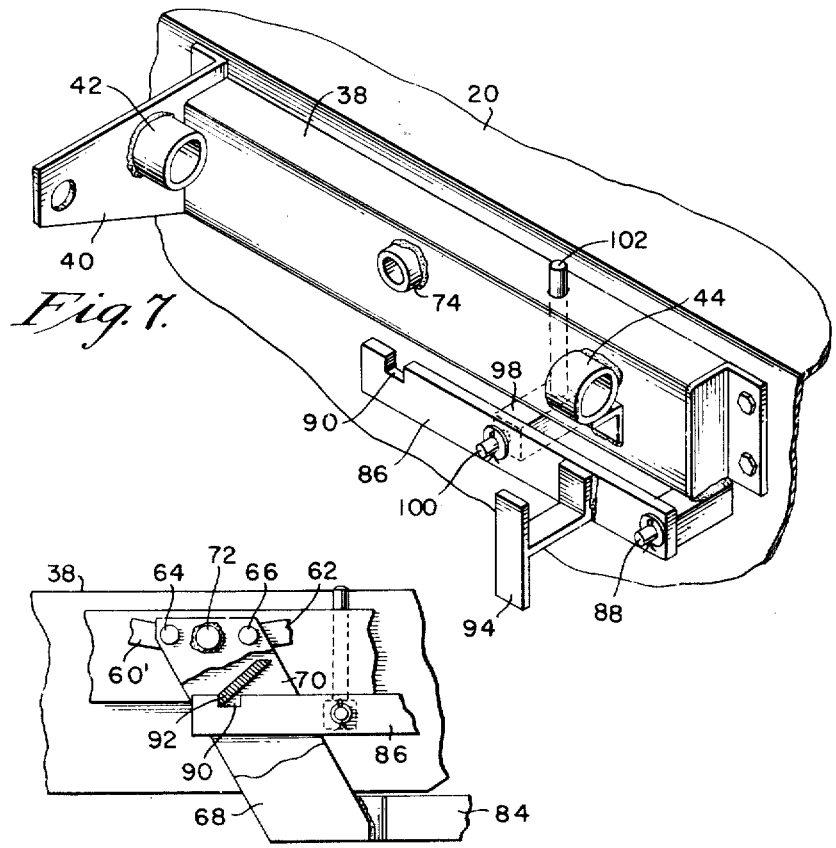
INVENTORS.
CHARLES BRADFORD SHEPPARD
BY PAUL TENENBAUM
Caesar and Rivise
ATTORNEYS.

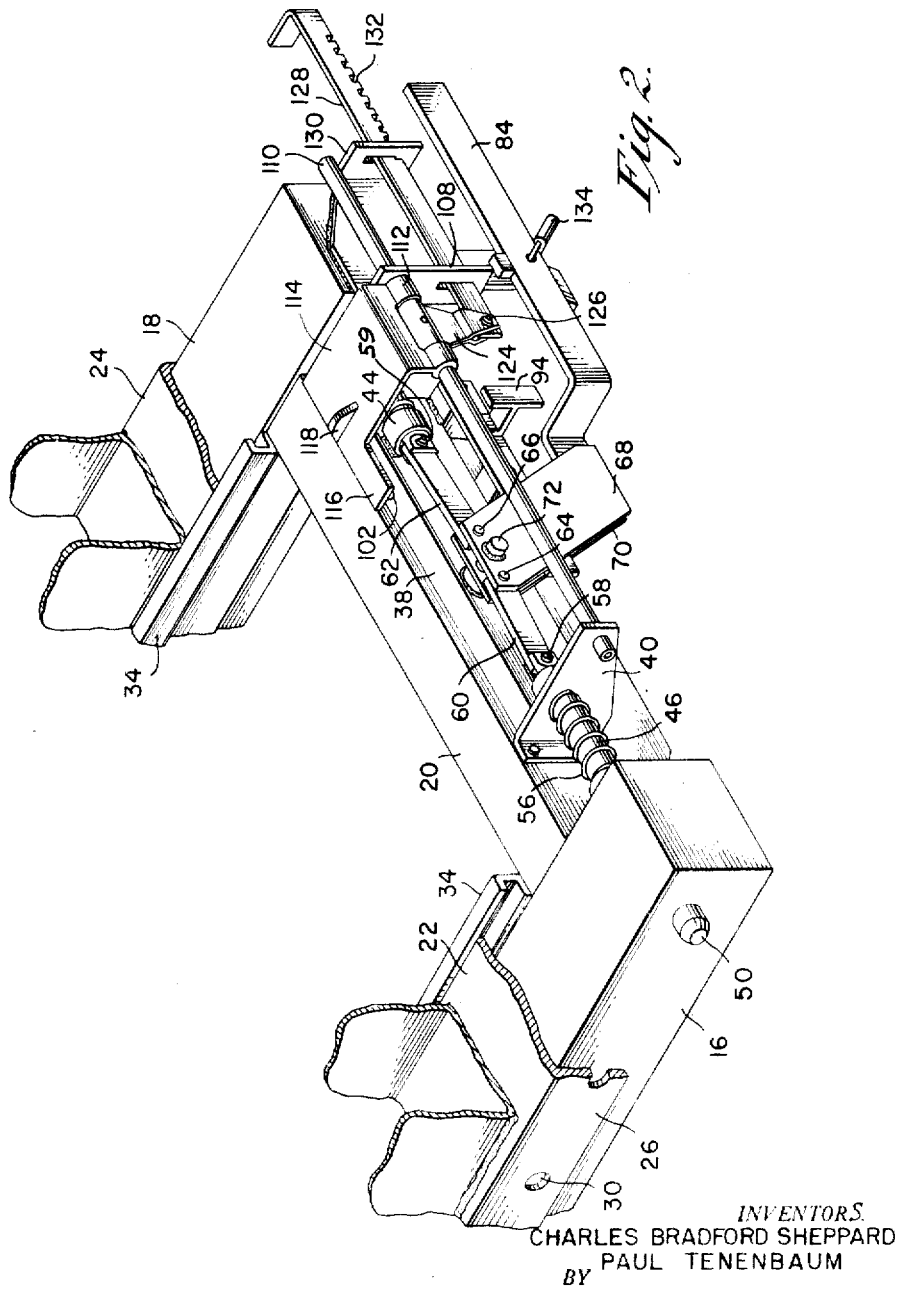

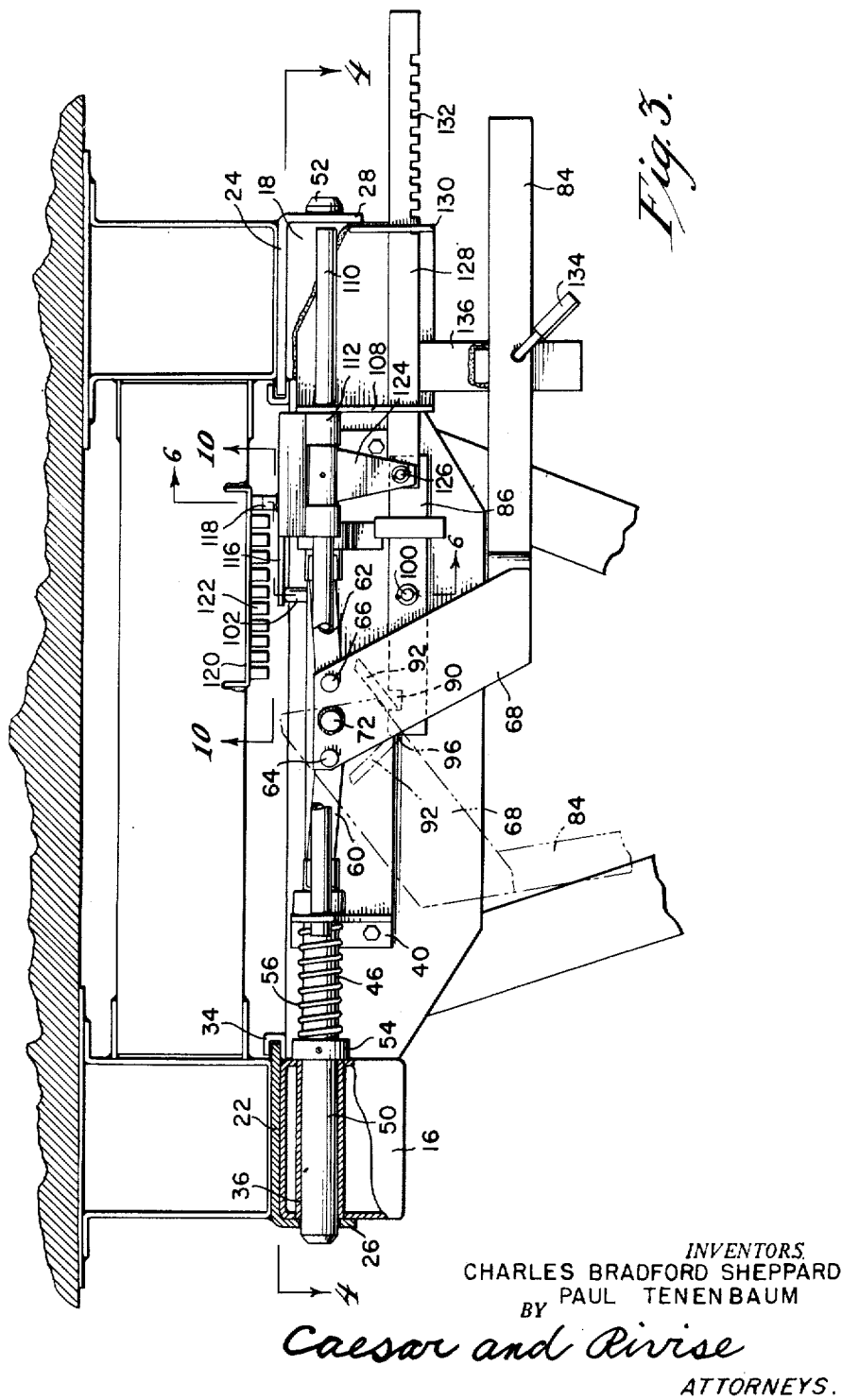

April 22, 1958 C. B. SHEPPARD ET AL 2,831,700
PRE-SELECTOR FOR POSITIONING RUNNING GEAR
RELATIVE TO TRAILER BODY LOAD
Filed May 10, 1955 5 Sheets-Sheet 4
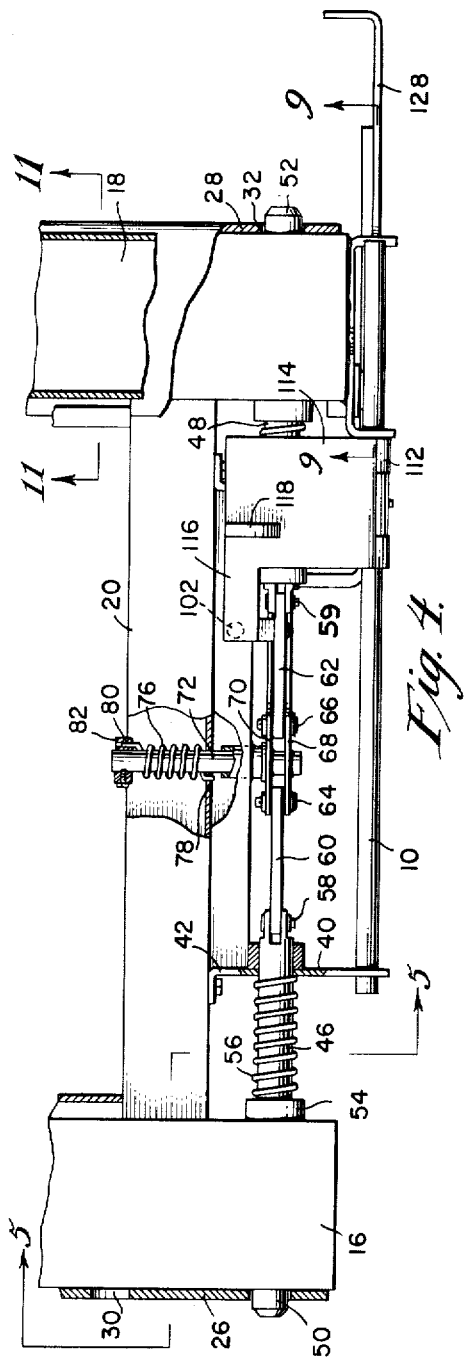
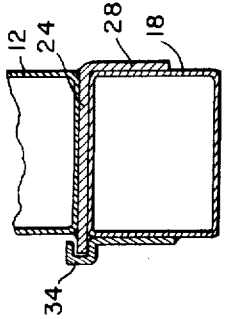
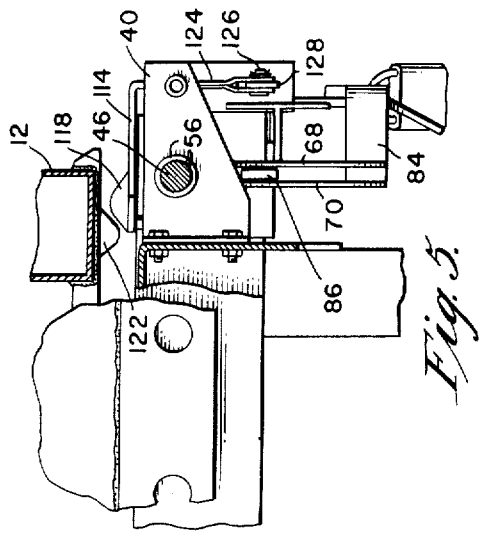
INVENTORS.
CHARLES BRADFORD SHEPPARD
BY PAUL TENENBAUM
Caesar and Rivise
ATTORNEYS.

INVENTORS.
CHARLES BRADFORD SHEPPARD
PAUL TENENBAUM
BY
*Caesar and Rivise*
ATTORNEYS

United States Patent Office 2,831,700
Patented Apr. 22, 1958

2,831,700

PRE-SELECTOR FOR POSITIONING RUNNING GEAR RELATIVE TO TRAILER BODY LOAD

Charles Bradford Sheppard, Meadow Brook, and Paul Tenenbaum, Philadelphia, Pa., assignors, by mesne assignments, to Fruehauf Trailer Company, Detroit, Mich., a corporation of Michigan Application May 10, 1955, Serial No. 507,342

7 Claims. (Cl. 280—81)

This invention relates to a motor vehicle and more particularly to a tractor-trailer equipped with a novel means for pre-selecting and adjustably positioning the trailer body load relative to the running gear.

Individual States of the United States have legal requirements with respect to the maximum loads which may be applied on the drive axle and front axle of the tractor and the tandem axle or running gear of the trailer of a tractor-trailer.

These requirements vary from State to State and consequently present problems of shifting the body loads relative to the various axles when going from one State to another in order to comply with the legal requirements of these States.

Heretofore, the practice was either to shift the cargo loads or to arrange the cargo loads initially to comply with the maximum requirements of a particular State in a particular route of the tractor-trailer. This effected losses not only in labor time, but also in pay loads since, in order to comply with the maximum requirements of a particular State, it was frequently necessary to carry less than the full pay load.

The primary object of the present invention is to provide a mechanical structure on a tractor-trailer which will make it possible for one readily and easily to shift the trailer load relative to the running gear as required in the various States without the necessity of altering the cargo load and without the necessity of losing any portion of the pay load.

Another object of this invention is to provide a preselector for positioning the trailer body load relative to the running gear which is readily accessible, easily operable and at the same time effects a safe and structurally sound coupling between the trailer body and the running gear.

Another object of the invention is to provide a preselector of the character described in which the trailer body is slidably mounted upon the running gear and includes a means to couple the trailer body to the runing gear, a means to releasably retract the coupling means and a means to automatically move the coupling means from its retracted position to a pre-selector coupling position in response to a predetermined movement of the trailer body on the running gear.

These and other objects of the invention will become more apparent as the following description proceeds in connection with the accompanying drawings, wherein:

Figure 1 is a side elevational view of a tractor-trailer incorporating the pre-selector;

Figure 2 is an enlarged fragmentary perspective view of the rear of the tractor-trailer showing those parts of the pre-selector which are associated only with the running gear;

Figure 3 is an enlarged sectional view taken on the line 3—3 of Figure 1;

Figure 4 is a sectional view taken on the line 4—4 of Figure 3;

Figure 5 is a sectional view taken on the line 5—5 of Figure 4 and rotated 90°;

Figure 7 is an enlarged perspective view of the rear portion of the running gear, parts being excluded for purposes of clarity;

Figure 8 is a fragmentary enlarged elevational view looking towards the front of the trailer, with parts broken away and shown in section to illustrate the latching mechanism;

Figure 11 is a sectional view taken on the line 11—11 of Figure 4.

Specific reference will now be made to the drawings wherein similar reference characters are used for corresponding elements throughout.

Figure 6:
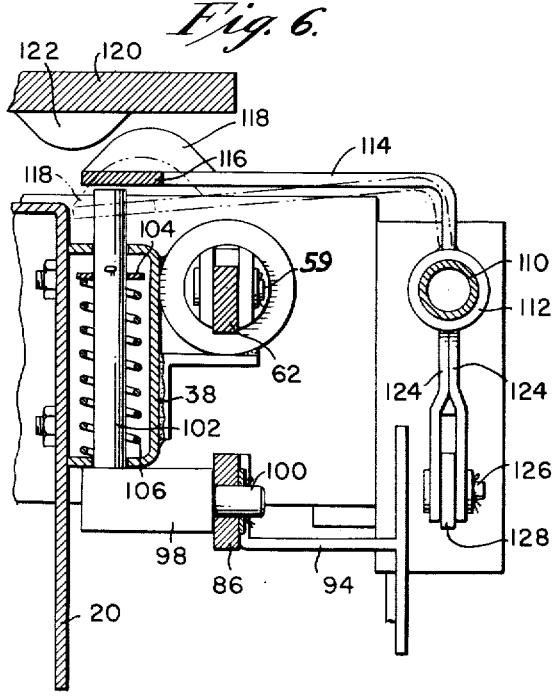
Figure 6 is an enlarged sectional view taken on the line 6—6 of Figure 3.
Figure 9:
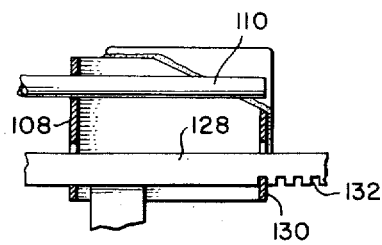
Figure 9 is a sectional view taken on the line 9—9 of Figure 4.
Figure 10:
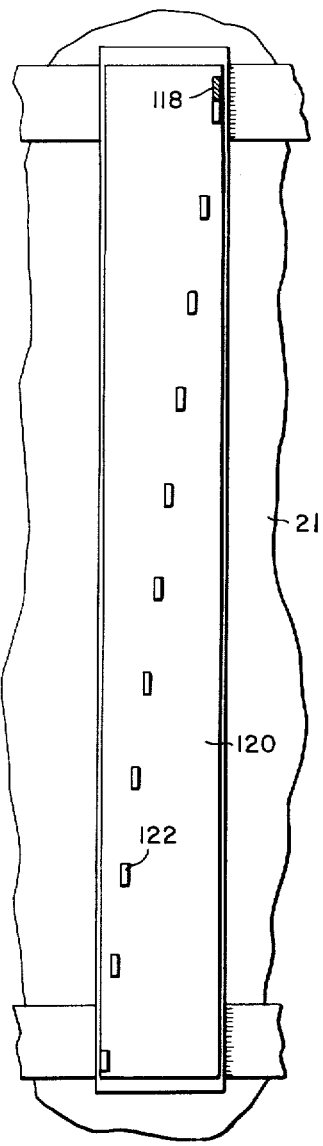
Figure 10 is a sectional view taken on the line 10—10 of Figure 3.

The present invention may be applied to any motor vehicle in which the body is slidably adjustable upon the running gear but more specifically to a tractor-trailer 10 having a trailer body 12 for receiving a cargo load and running gear 14. The running gear comprises, among other things, a pair of spaced parallel longitudinal side rails 16 and 18 which are interconnected by transverse members, one of which 20 is located adjacent the rear of the running gear. The trailer body includes, besides the side and end walls and the bottom wall 21, any suitable means for slidably positioning the body on the running gear rails 16 and 18. This is best accomplished by providing at the bottom and running along the longitudinal sides thereof a pair of tracks 22 and 24 engaging the rails 16 and 18. The tracks includes skirt portions 26 and 28 extending along the sides of the rails and including a plurality of apertures 30 and 32 which are spaced apart a predetermined distance, such for example as six or twelve inches. The running gear may be additionally provided with longitudinal channels 34 adapted to embrace a portion of the tracks to guide the movement of the trailer body on the running gear.

At a predetermined location adjacent the rear ends of the rails, the latter are provided with transversely extending apertures or bores 36. As will appear hereinafter, the trailer body may be moved on the rails so that a selected one of the pair of apertures 30 and 32 will be in transverse alignment with the bores 36.

A means is provided for effecting a coupling and uncoupling of the trailer body and the running gear. This means includes a housing 38 which is secured to the transverse member 20 of the running gear, one end of which includes a bracket 40 with a short collar 42 secured thereto and a further collar 44 which is secured to the housing 38 opposite to the bracket 40 and in transverse alignment wtih the collar 42. A pair of coupling rods 46 and 48 are slidably mounted in the collars 42 and 44 and have outer end portions 50 and 52 which are slidable in the bores 36 of the running gear rails. Collars 54 are secured to each of the coupling rods at the inner walls of the rails and a spring 56 is wound about each of the coupling rods and interposed between each of the collars 54 and the bracket 40 and the collar 44 respectively. The tension of the spring is such that the coupling rods are urged outwardly towards the trailer body tracks and is therefore illustrative of a means to urge the coupling rods towards and into engagement with the spaced apertures 30 and 32 in the tracks.

The coupling rods are designed to operate in unison and accordingly, their inner ends are pivoted as at 58 and 59 to a pair of links 60 and 62 which are in turn pivoted at their inner ends as at 64 and 66 between a pair of spaced plates 68 and 70. The plates 68 and 70 are rotatable about a horizontal axis and this is accomplished by securing centrally to the plates a stub shaft 72 which extends rotatably through a bearing 74 on the housing 38 and which also extends through the transverse member 20 of the running gear, as shown clearly in Figure 4. A spring 76 is wound about the stub shaft 72 and is secured at one of its ends as at 78 to the transverse member 20 and at its other end as at 80 to a collar 82 which is fixed upon the free end of the stub shaft. The tension of the spring 76 is such as to urge the plates 68 and 70 in a counter-clockwise direction and thereby assist the springs 56 in urging the coupling rods 46 and 48 outwardly and into coupling engagement with the trailer body tracks. Secured to the lower ends of the plates 68 and 70 is an elongated bar 84 serving as a handle by which the plates may be rotated for a purpose later to appear.

A means is provided for releasably retaining the plates 68 and 70 against rotation or, to selectively hold the rods 46 and 48 in the coupled or the uncoupled position. This means comprises a latch bar 86 which is pivoted at its outer end as at 88 to the transverse member 20 of the running gear below the housing 38, as shown more clearly in Figure 7. The inner end portion of the latch bar 86 is adapted to extend between the plates 68 and 70 and adjacent this inner end is provided a notch 90. Between the plates 68 and 70 is secured a keeper 92 preferably in the form of a bar located at a predetermined angle and having opposite inclined or cam surfaces. The latch bar 86 is provided with a suitable handle 94 for the manipulation thereof.

Thus, when the handle 84 associated with the plates 68 and 70 is on the right hand side of the figures, and particularly as shown in solid lines in Figure 3, the rods 46 and 48 are in the coupling position. In this position the notch 90 adjacent the inner end of the latch bar 86 engages one surface of the keeper 92. When it is desired to retain the rods in the uncoupled position, the handle 94 is used to exert a pull on the latch bar 86 so that the notch 90 disengages the keeper 92. At this point, the handle 84 is turned to the left of the figures as particularly shown in dotted lines in Figure 3. This action retracts the coupling rods until a point is reached whereby the opposite inclined surface of the keeper 92 engages the edge of the inner end of the latch bar 86 and holds the plates 68 and 70 against rotation to the right. This is clearly shown in dotted lines at 96 in Figure 3.

A means is provided whereby the trailer body load may be adjustably shifted relative to the running gear in response to a predetermined movement of the body relative to the running gear. This means comprises a bar 98 which is secured as at 100 to the latch bar 86 intermediate its ends. The bar 98 extends rearwardly and beneath the housing 38 and secured to said bar or carried thereby is an upstanding or vertical rod 102. This rod extends slidably through a pair of upper and lower apertures in the housing 38, as shown clearly in Figure 6. Secured on the vertical rod 102 is a washer or abutment 104, there being a coiled spring 106 wound about the rod and interposed between the abutment 104 and the lower portion of the housing 38. The tension of the spring is such that it normally urges the vertical rod 102 upwardly. This spring also acts to urge the latch bar 86 upwardly and towards engagement with the keeper 92.

Extending transversely of the running gear and mounted slidably in the bracket 40 and in another bracket 108 carried by the running gear is a rod or tube 110. Hingedly secured upon the rod 110 as at 112 is a forwardly extending plate 114 having a lateral portion 116 which overlies the vertical rod 102. Upstanding from the upper surface of the plate 114 at a predetermined location is a lug 118 having opposed inclined cam surfaces.

Secured by any appropriate means to the bottom wall 21 of the trailer body is a longitudinal plate 120 having a plurality of transversely and longitudinally spaced cam lugs 122. Each of the cam lugs 122 is of approximately the same size and dimensions as that of the lug 118 on the plate 114. The longitudinal spacing of the cam lugs 122 is correlated to the longitudinal spacing of the apertures 30 and 32 in the trailer body tracks, that is, if the apertures 30 and 32 are spaced apart six or twelve inches, the cam lugs 122 will also be spaced apart six or twelve inches.

The transverse spacing of the cam lugs 122 may be arbitrarily chosen at any figure, such for example as three-quarters of an inch.

A means is provided whereby the lug 118 on the plate 114 may be adjustably aligned with a selected one of the trailer body lugs 122. This means comprises a pair of plates 124 which are secured to the transverse rod 110 and which are in turn pivoted as at 126 to a transversely extending bar 128. The bar extends slidably through the bracket 108 and also through a further bracket 130 carried by the running gear rail 18, the bracket 130 serving as a keeper to engage in a selected one of a number of notches 132 which are provided in the lower surface of the bar 128. The spacing of the notches 132 is correlated with the transverse spacing of the cam lugs 122 depending from the bottom of the trailer body. Thus if the bar 128 is raised and moved inwardly or towards the left of the figures, the plate 114 will be moved to the left thereby. Depending upon the notch 132 chosen for the adjustment, the lug 118 on the plate 114 will thereby be moved into a position of longitudinal alignment with the cam lug 122 which corresponds to the notch 132 chosen for the adjustment.

In use, the trailer body is loaded with cargo and is coupled to the running gear. When it becomes necessary to shift the trailer body so that the load is distributed on the various axles in compliance with a particular State law and in a manner different from the original coupling position, the present pre-selector device comes into use. By means of the handle 94, the latch 86 is disengaged from the keeper 92 and the handle 84 is rotated clockwise until the coupling rods 46 and 48 are retracted from the previously engaged apertures 30 and 32 in the tracks of the trailer body. At this point, the trailer body is free to move on the running gear and the coupling rods are releasably held in their retracted position by means of the keeper 92 bearing against the edge of the inner end of the latch bar 86 as at 96.

By the use of appropriate calculations or a chart, the driver of the vehicle knows in advance what distance the trailer body must be advanced or retracted relative to the running gear, that is, relative to the tandem axles, in order to redistribute the loads on the axles in compliance with a particular State law. In terms of the apertures 30 and 32 in the trailer body tracks, this may mean, for example, that the trailer body must be advanced a space equivalent to two of said apertures.

To effect this, the driver moves the bar 128 to the left two notches beyond its original setting. This moves the plate 114 to the left so that its cam lug 118 is in alignment with the appropriate lug 122 carried by the trailer body.

Then the driver moves the running gear relative to the trailer body. Prior to the time that the running gear is moved and the rods 46 and 48 have been maintained in an uncoupled position, the lateral extension 116 of the plate 114 has been overlying the vertical rod 102 associated with the latch bar 86. When the running gear is moved relative to the trailer body, or vice versa, the relative movement comes to the point where the pre-selected lug 122 of the trailer body strikes the lug 118 on the plate 114. As it strikes the lug 118 and overrides the same as shown in Figure 6, the plate 114 is pressed downwardly against the vertical rod 102. The latter causes the latch bar 86 to pivot about its pivot pin 88 and thereby to disengage from the keeper 92. As soon as this happens, the combined action of the springs 56 and 76 push the coupling rods 46 and 48 outwardly and urge them into automatic engagement with the preselected pair of apertures 30 and 32 in the trailer tracks. The latch bar 86 reengages the keeper 92 in the final coupling position. To prevent unauthorized tampering with the mechanism, an appropriate lock 134 may be used to connect to operating handle 84 with an appropriate bar 136 depending from the running gear to bracket 108.

While a preferred embodiment of the invention has been shown and described hereinabove, skilled artisans may make minor variations without departing from the spirit of the invention and the scope of the appended claims.

We claim:

1. In a motor vehicle having running gear including interconnected side rails and a body having a bottom wall and bottom side tracks slidably engaging the rails, a pre-selector for positioning the body load relative to the running gear comprising a plurality of apertures provided in said tracks spaced apart a predetermined distance, a pair of coupling rods mounted upon said running gear for sliding movement through said side rails, resilient means normally urging the outer ends of said rods through said rails and into engagement with a pair of said track apertures, a bar rotatably mounted on said running gear and pivotally interconnecting the inner ends of said rods whereby rotation of said bar in a given direction will retract said rods against action of said resilient means, a keeper carried by said bar, a latch bar pivoted to said running gear adapted to engage said keeper and retain said rods either in the retracted or in the coupling position, a further rod carried by said latch bar, and means correlated with the spacing of said track apertures reactive upon said further rod in response to a predetermined movement of said body on said running gear whereby said latch bar will turn about its pivot, disengage from said keeper and permit said resilient means to urge said coupling rods into engagement with a pre-selected pair of track apertures.

2. The combination of claim 1 wherein said last-named means includes a plate mounted for pivotal and slidable movement on said running gear, said plate including a portion overlying said further rod and a lug extending upwardly from said plate, transversely and longitudinally spaced bearing lugs carried by said bottom wall of said body, the longitudinal spacing of said bearing lugs being correlated with the spacing of said track apertures, and means to adjustably move said plate whereby said lug thereon is in alignment with a selected one of said bearing lugs so that upon predetermined movement of said body on said running gear, said aligned lugs will engage, depress said plate, actuate said further rod, cause said latch bar to disengage from said keeper and allow said resilient means to urge said coupling rods into engagement with a selected pair of track apertures.

3. The combination of claim 2 wherein said adjustable plate moving means includes a transverse rod slidably mounted on said running gear, said plate being pivoted on said transverse rod, a transverse bar pivoted to said rod, spaced notches in said transverse bar and a keeper to engage a selected one of said notches, the spacing of said notches being correlated to the transverse spacing of said bearing lugs.

4. In a motor vehicle having running gear including side rails and a body including tracks slidably engaging the rails, spaced apertures provided in said tracks, a pair of pivotally interconnected coupling rods slidably mounted on said running gear, said rods including outer end portions slidable through said rails and adapted to engage in said track apertures, resilient means normally urging said rods into engagement with said track apertures, and means selectively and releasably holding said rods in a retracted and coupled position, said last-named means including a plate rotatably mounted on said running gear and pivoted to the inner end portions of said rods, a keeper carried by said plate, and a latch bar pivoted at one of its ends to said running gear, said latch bar including a notch adjacent its other end engaging said keeper when the rods are in a coupling position, the keeper bearing against said other end of said latch bar when the plate is rotated and the rods are in the retracted position.

5. In a motor vehicle having running gear including side rails and a body including tracks slidably engaging the rails, spaced apertures provided in said tracks, a pair of pivotally interconnected coupling rods slidably mounted on said running gear, said rods including outer end portions slidable through said rails and adapted to engage in said track rails, resilient means normally urging said rods into engagement with said track apertures, pivoted latch means selectively holding said rods in coupled and uncoupled positions and means to release said latch means and allow the coupling rods to move from the uncoupled to the coupled position in response to a predetermined movement of said body on said running gear, said last-named means including a vertical rod carried by said pivoted latch means, a member slidably mounted on said running gear, a plate hinged on said member and including a portion overlying said vertical rod, means to adjust the position of said plate, and means operative between said plate and said body to depress said plate and vertical rod and thereby actuate said latch means in response to a predetermined movement of said body on said trailer.

6. The combination of claim 5 wherein said plate depressing means includes a lug on said plate and a plurality of transversely and longitudinally spaced bearing lugs carried by said body, the longitudinal spacing of said bearing lugs being correlated to the spacing of said track apertures, only a selected one of said bearing lugs being adapted to bear against said plate lug to depress said plate and said vertical rod.

7. The combination of claim 6 wherein said plate adjusting means includes a bar pivoted to said member, spaced notches in said bar and a keeper to engage a selected one of said notches, the spacing of said notches being correlated to the transverse spacing of said bearing lugs.

References Cited in the file of this patent

UNITED STATES PATENTS 2,332,326    Lex    Oct. 19, 1943